Feb. 28, 1956 L. H. MATHEWS 2,736,126
FISHHOOK REMOVER
Filed Sept. 21, 1953
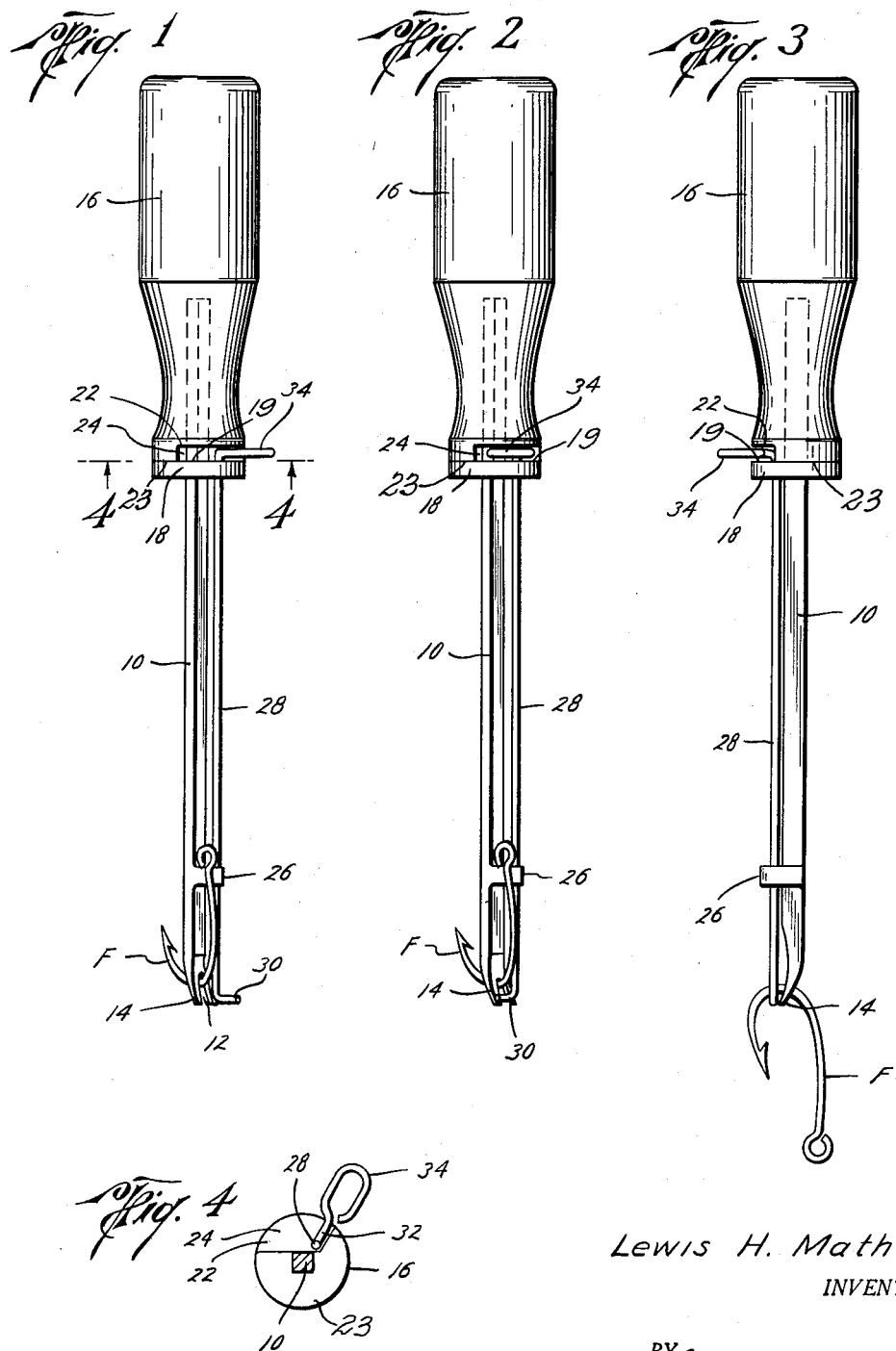
Lewis H. Mathews
INVENTOR.
BY Charles E. Lightfoot
ATTORNEY

United States Patent Office 2,736,126
Patented Feb. 28, 1956

2,736,126

FISHHOOK REMOVER

Lewis H. Mathews, Houston, Tex.

Application September 21, 1953, Serial No. 381,329

3 Claims. (Cl. 43—53.5)

This invention relates to a fish hook removing implement, and more particularly to a device by which a fish hook may be disgorged and removed from the mouth of a fish.

The invention has for an important object the provision of a hook removing implement which is engageable with a fish hook to release the same from the flesh of the fish, and which also embodies means for retaining the hook on the implement in position for removal from the fish's mouth without danger of the point of the hook snagging or re-entering the fish.

Another object of the invention is to provide a hook removing implement having a notch or claw portion which is engageable with a fish hook to permit the hook to be pushed or pried loose from the flesh of the fish, and also having latch means which is operable to retain the hook on the implement in a position to prevent the point of the hook from re-entering the fish while being withdrawn from the fish's mouth.

A further object of the invention is the provision of a hook removing implement of the type referred to having hook retaining means which is thumb actuated and which may be easily moved to active or inactive position without interruption of the use of the implement.

A still further object of the invention is to provide a hook removing implement which is of simple design and rugged construction, and which may be easily and economically manufactured.

The above and other important objects and advantages of the invention will best be understood from the following detailed description, constituting a specification of the same, when considered in conjunction with the annexed drawings, wherein—

Figure 1 is a top plan view of the invention, showing the same in engagement with a fish hook, in position to release the hook from the fish, and with the hook retainer means in inactive position.

Figure 2 is a view similar to that of Figure 1, showing the hook retainer means in its active position;

Figure 3 is a view similar to that of Figure 1, showing the implement after the hook has been disengaged from the fish with the hook in position for withdrawal from the fish's mouth; and Figure 4 is a cross-sectional view, taken along the line 4—4 of Figure 1, looking in the direction indicated by the arrows.

Referring now to the drawings in greater detail the remover device of the invention comprises an elongated shaft 10, which is provided at one end with a V-shaped notch 12, formed by curved claw portions 14, and which has attached coaxially to its other end a suitable handle 16. The shaft 10 is preferably formed with a laterally extending external enlargement 18, mediate its ends and in the present illustration is of rectangular cross section.

The handle 16 may be formed of any suitable material, such as wood, and is provided with a central longitudinal bore, into which the shaft is tightly fitted, and which may be secured to this shaft in any suitable manner, as by glueing.

The handle 16 also has a cut away portion at its forward end to provide an end face 22, which is positioned in longitudinally spaced relation to the enlargement 18, to form therewith a laterally opening groove 24, for a purpose later to be made apparent. The enlargement 18 and handle 16 have meeting faces 19 and 23 respectively. A laterally extending perforated lug 26, is provided on the shaft 10, spaced somewhat inwardly of the outer end of the shaft.

The remover has latch mechanism, whereby the hook may be securely held in the notch 12, which latch mechanism comprises an elongated rod 28, extending through the perforated lug 26 and through a suitable opening in the enlargement 18, whereby the rod is mounted for axial rotation in parallel relation to the shaft 10. The rod has at its outer end a laterally extending portion 30, which is positioned to overlie the diverging claws 14 outwardly of the bottom of the notch 12, when the rod is rotated to a latching position, to latch the fish hook in the notch, and which extends laterally away from the claws in its inactive position upon rotation of the rod in the other direction, to permit the insertion of the hook into the notch, and the ready removal of the same therefrom.

At the handle end of the remover the rod extends through the enlargement 18 into the slot 24, and is provided with a laterally outwardly extending portion 32 which extends beyond the slot and is formed with an eye 34 positioned for engagement by the thumb of a user, whereby the rod 28 may be readily rotated to move the end portion 30 to its active or inactive position.

As best seen in Figure 4 of the drawings, the slot 24 is of limited extent, so that the laterally extending portion 32 of the rod will engage the handle 16 at the opposite ends of the slot to limit the rotation of the rod in either direction.

In making use of the invention, constructed as described above, the latch mechanism is moved to the position shown in Figure 1 and the notch end of the shaft 10 is inserted in the fish's mouth into engagement with a fish hook, indicated at F, so that the hook is received in the notch 12 in the manner illustrated in Figure 1.

With the hook so positioned in the notch 12, the rod 28 may be rotated by the user, by engaging the eye 34 with his thumb, to move the end portion 30 of the rod into latching position, as illustrated in Figure 2, to close the notch 12 against the removal of the firsh hook therefrom. By suitable manipulation of the remover the hook F may then be pushed and pried loose from the fish, and upon outward movement of the remover from the fish's mouth the hook F will immediately turn over to the position illustrated in Figure 3, in which position it is impossible for the hook to re-enter the fish, so that the hook may be readily withdrawn from the fish's mouth.

It will thus be seen that the invention provides a fish hook remover which is easily manipulated, and by which a hook may be readily removed from the fish and securely held in a position to prevent re-entrance of the hook while the same is being withdrawn from the fish.

While the invention has been disclosed herein in connection with a certain specific embodiment of the same, it will be understood that this is intended by way of illustration only, and that numerous changes can be made in the construction and arrangement of the various parts, without departing from the spirit of the invention or the scope of the appended claims. Having thus clearly shown and described the invention, what is claimed as new and desired to secure by Letter Patent is:

1. A fish hook remover comprising a shaft having a hook-engaging notch at one end, a handle on the other end of the shaft and coaxial therewith, said shaft having an enlargement mediate its ends shaped to provide a laterally extending face and said handle having an end face engageable with said face of said enlargement, said shaft having a laterally extending lug thereon spaced longitudinally from the enlargement, a rod journalled in said enlargement and lug for axial rotation and having a laterally extending portion at one end movable by rotation of the rod into and out of a position to hold a hook in said notch to prevent withdrawal of the hook from the notch, and means on the other end of the rod operable to rotate the rod.

2. A fish hook remover comprising a shaft having a hook-engaging notch at one end, a handle on the other end of the shaft and coaxial therewith, said shaft having an enlargement mediate its ends shaped to provide a laterally extending face and said handle having an end portion spaced from said enlargement to form therewith a laterally outwardly opening groove, a rod mounted on the shaft in parallel relation thereto for axial rotation and having a laterally extending end portion movable by rotation of the rod into and out of a position to hold a hook in said notch to prevent withdrawal of the hook from the notch, said rod extending into said groove, and means on the rod in the groove and extending laterally of the rod beyond the groove in position for operation to rotate the rod.

3. A fish hook remover comprising a shaft having a hook-engaging notch at one end, a handle on the other end of the shaft and coaxial therewith, said shaft having an enlargement mediate its ends shaped to provide a laterally extending face positioned in engagement with the adjacent end of the handle, said handle having an end face portion spaced from said face of said enlargement to form therewith a laterally outwardly opening groove, a rod mounted on the shaft for axial rotation and having an end portion movable to a position away from the notch upon rotation of the rod in one direction and to a position to hold a hook in the notch upon rotation of the rod in the other direction, said rod extending into said groove and means on the rod extending laterally beyond the groove in position for operation to rotate the rod.

References Cited in the file of this patent

UNITED STATES PATENTS

| | | |
|---|---|---|
| 481,897 | Cull | Aug. 30, 1892 |
| 1,049,956 | Wheeler | Jan. 7, 1913 |
| 1,731,070 | Kimbrell | Oct. 8, 1929 |
| 2,135,232 | Dawn | Nov. 1, 1938 |
| 2,507,083 | Anderson | May 9, 1950 |
| 2,670,561 | Howorth | Mar. 2, 1954 |